United States Patent [19]
Anderson, Jr. et al.

[11] Patent Number: 4,583,128
[45] Date of Patent: Apr. 15, 1986

[54] CONTINUOUS TONE RECORDING SYSTEM INCORPORATING FEEDBACK CONTROL CIRCUIT

[75] Inventors: Walter F. Anderson, Jr., Minneapolis; Gary R. Ashton; Peter B. Jamieson, both of St. Paul, all of Minn.

[73] Assignee: Minnesota Mining and Manufacturing Company, St. Paul, Minn.

[21] Appl. No.: 644,874

[22] Filed: Aug. 27, 1984

[51] Int. Cl.$^4$ .............................................. H04N 1/22
[52] U.S. Cl. .................................... 358/302; 346/109; 358/298
[58] Field of Search ....................... 358/302, 298, 300; 346/108, 109, 160

[56] References Cited

U.S. PATENT DOCUMENTS

| | | | |
|---|---|---|---|
| 3,811,009 | 5/1974 | Fukumoto et al. | 178/6.7 |
| 4,028,732 | 6/1977 | Salter et al. | 358/302 X |
| 4,054,928 | 10/1977 | Butler et al. | 360/79 |
| 4,175,851 | 11/1979 | Kitamura et al. | 355/14 R |
| 4,351,005 | 9/1982 | Imai et al. | 358/302 X |
| 4,434,431 | 2/1984 | Ohkubo et al. | 346/160 X |

OTHER PUBLICATIONS

Performance Comparisons of Electrophotographic, Dry Silver, and Wet Processed Recording Media Exposed with Gas Laser and Laser Diode Light Sources for Image Recording, by: D. G. Herzog and L. W. Dobbins; 1983; vol. 390, SPIE Conference Proceedings, Los Angeles, CA.

*Primary Examiner*—E. A. Goldberg
*Assistant Examiner*—Patrick W. Foster
*Attorney, Agent, or Firm*—Donald M. Sell; James A. Smith; Lorraine R. Sherman

[57] ABSTRACT

A continuous tone image recording system comprises a solid state laser diode capable of sending out an analog signal-controlled pulsed beam of light, a continuous feedback circuit for stabilizing the laser diode light output, and an optical system for changing the path of the beam of light. The laser beam scans across a photosensitive receptor surface to provide scanned lines, which are positioned along the length of the receptor surface so as to provide images containing at least 64 levels of gray on transparent recording media or at least 32 levels of gray on opaque media.

10 Claims, 3 Drawing Figures

CONTINUOUS TONE RECORDING SYSTEM INCORPORATING FEEDBACK CONTROL CIRCUIT

DESCRIPTION

1. Field of the Invention

The present invention relates to a system and method for providing photographic quality continuous tone images from a digital data base using a laser diode light source. The images are useful, for example, in medical electronic imaging systems, high quality facsimile, and in the graphic arts.

2. Background of the Invention

Printing has long been an "impact" technology. In the last few years, non-impact printers utilizing optical scanning systems capable of providing alpha-numeric text and line drawings have become commercially available.

Optical scanning and recording systems in which lasers are used for exposing images from digital data stored in computer memory onto plates or film are known. An externally modulated beam is used to write information on a photosensitive medium. These systems include office printers for text, rotating drum scanners for color separation for printing, and flying spot scanners using gas lasers for newspaper plate making. The capability of these systems to reproduce photographic images is limited to half-tone methods of information recording.

D. G. Herzog and L. W. Dobbins, Recording Systems, RCA Government Communications Systems, Camden, NJ, in "Performance Comparisons of Electrophotographic; Dry Silver, and Wet Processed Recording Media Exposed with Gas Laser and Laser Diode Light Sources for Image Recording", (vol. 390, SPIE Conference Proceedings, Los Angeles, CA, 1983) broadly disclose a system using analog modulation of solid state laser diodes to print on various photosensitive materials. No mention is made of any capability for obtaining large numbers of gray levels on transparent or opaque media, of achieving scan line placement accuracy, or of accurately correcting the path of the laser beam used.

U.S. Pat. No. 3,811,009 discloses a facsimile device which makes use of a gas laser system as a light source to provide high speed recording by modulating the laser beam through an acousto-optic modulator. U.S. Pat. No. 4,054,928 discloses a scanning and printing gas laser system which scans and digitizes graphical information for recording on magnetic tape and also prints graphic information previously stored in digital form on a magnetic tape. This patent also teaches use of an acousto-optic modulator. The gray scale is accomplished by half-toning.

U.S. Patent No. 4,175,851 discloses a laser diode scanning system which relates to the accurate positioning of data by a scanning beam in the scan direction. The system is capable of printing alpha-numeric characters. There is no mention of photographic reproduction capabilities.

SUMMARY OF THE INVENTION

The present invention provides a continuous tone image recording system comprising a solid state laser diode capable of sending out an analog signal-controlled pulsed beam of light, a continuous feedback circuit for stabilizing the laser diode light output, an optical system for changing the path of the beam of light, a single linear film pass scanning means for scanning the laser beam across a photosensitive receptor surface to provide scanned lines, and means for positioning the scanned lines along the length of the receptor surface so as to provide images containing at least 64 levels of gray on transparent recording media or at least 32 levels of gray on opaque media.

The present invention utilizes a solid state laser diode which provides significant advantages over state of the art optical scanning and recording systems which use gas lasers in terms of laser life, simplicity of optical system, no external modulator required, cost savings, and no prolonged warm-up times to stabilize the system. In particular, the solid state laser diode may be modulated by directly changing the current generating the light rather than using an expensive, space-consuming, external modulator as is required for gas lasers.

In the present invention, it has further been recognized that high quality, continuous tone, photographic grade images can be made with a scanned system only if special means are provided to ensure that each scanned line is precisely positioned with respect to the other lines. These means include corrective optics and specially designed film handling apparatus.

It is not generally appreciated that accuracy of scanned line placement is critical to obtaining high quality photographic continuous tone images. The present invention overcomes this deficiency using corrective optics such as those described in U.S. Pat. Nos. 4,040,096 and 3,750,189 which are incorporated herein by reference for their disclosure of optic systems, other optical controls, and careful design of the mechanical film handling system.

Compared with rotating drum scanners, the single linear film pass scanner of the present invention provides much greater convenience in film handling because there is no requirement to mount recording media on a drum. In addition, recording time in the present invention can be greatly reduced (by a factor of at least 10-fold) compared to rotating drum scanners. Also, the equipment costs can be much lower in the present invention.

Compared with prior art flying spot laser scanners, the laser scanner of the present invention is capable of providing significantly higher photographic quality images in terms of the number of gray levels which may be reproduced and the overall smoothness of the images. This is accomplished by much tighter control of, for example, scan line placement accuracy which is of the order of ±10 percent standard deviation for most prior art scanners compared to less than 2 percent in the present invention. Additional factors include careful control of intensity of light emanating from the laser diode, accurate correction of the light path, accurate control of the film transport, and accurate control of reflectivity variations in cases where rotating polygon mirrors are used for scanning.

In the present invention:

"continuous tone" means gradations in intensity of levels of gray so that the transition appears relatively smooth;

"light" means that part of the electromagnetic spectrum lying between 300 and 1500 nm, preferably between 750 and 900 nm;

"spot" means the profile of a laser beam on a recording medium after passing through an optical system;

"pixel" means a quantified unit of information and constitutes the smallest unit in the composition of a picture or image and comprises one of a plurality of levels of gray;

"gray levels" means controlled variations in density on an exposed recording medium which can be distinguished by measurement with a diffuse densitometer;

"image" means a picture comprised of a two-dimensional array of pixels; increasing the density of pixels and the number of gray levels contained in each pixel generally increases the photographic quality of continuous tone images;

"scan line" means a series of spots along the width of a recording medium; and

"accuracy of scan line placement" means the standard deviation in the position of adjacent scan lines.

DETAILED DESCRIPTION

Figure 1:
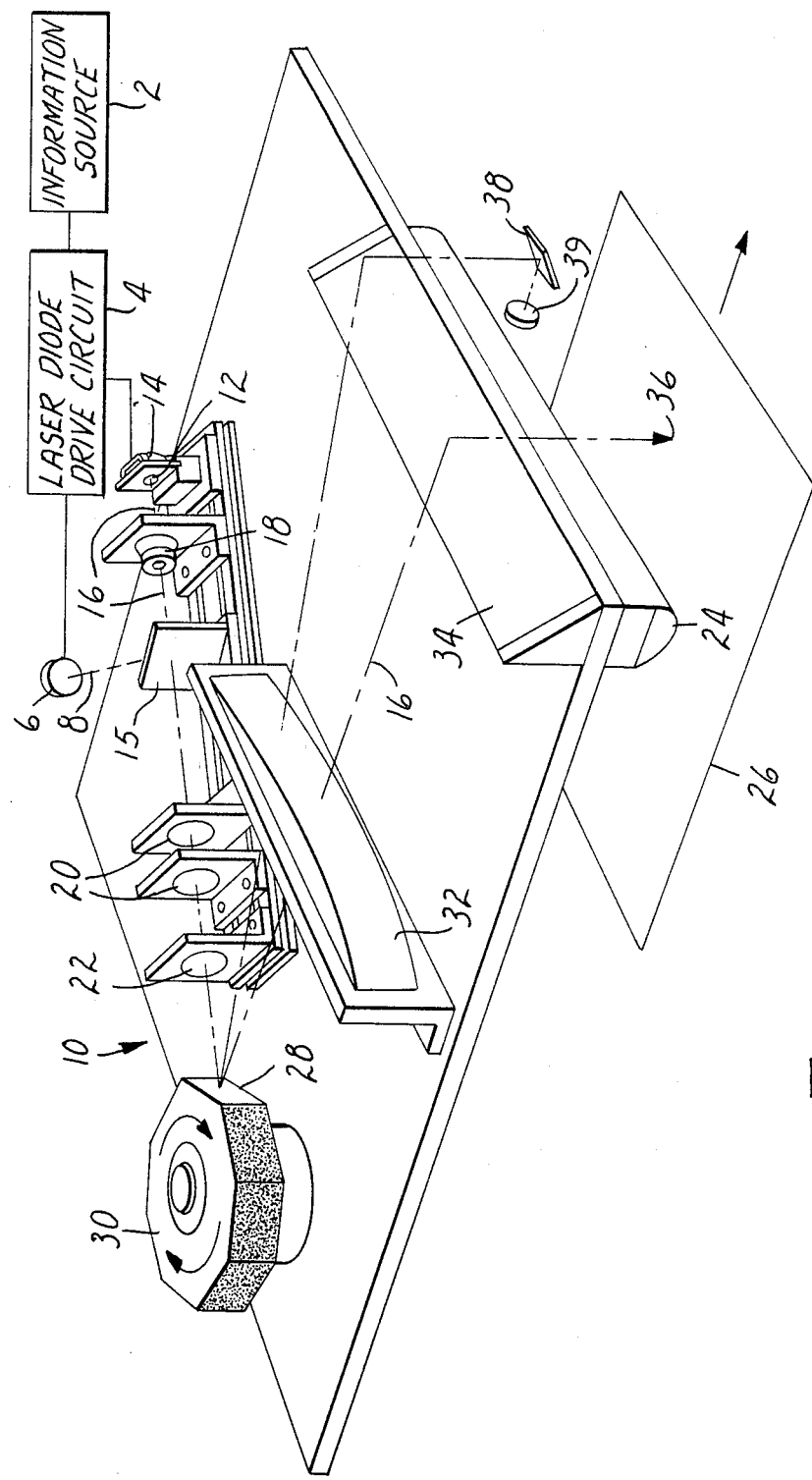
FIG. 1 shows a perspective view of one embodiment of a flying spot laser diode scanning system of the present invention.

The present invention provides an image recording system comprising:
a. means including a solid state laser diode for generating an analog signal-controlled, intensity-modulated beam of light,
b. a feedback circuit responsive to the instantaneous intensity of the light beam for continuously providing a feedback control signal coupled to said generating means for adjusting the laser diode to stabilize its light output, allowing virtually instantaneous changes in output intensity in response to an input signal while maintaining the output constant regardless of changes in the characteristics of the laser diode,
c. means for at least one of collimating, focusing, and controlling the path of said beam of light,
d. means for scanning said light beam across the width of an image plane at which a photosensitive recording medium having a sensitivity and exposure range matched to the intensity-modulated light beam may be positioned, said means providing scan lines on said recording medium,
e. means for positioning said scan lines consecutively and accurately along the length of said image plane, whereby the combination of the recited elements enable the formation at the image plane of a continuous tone image preferably in less than 5 minutes, most preferably in less than 1 minute, the combination of elements being capable of creating at least 64 gray levels when imaged onto a transparent medium or at least 32 gray levels when imaged onto an opaque medium.

Laser diodes useful in the present invention preferably have power capability of at least 3 milliwatts and most preferably at least 15 milliwatts or even 30 milliwatts or higher. Laser diodes are commercially available, for example, from Hitachi (Tokyo, Japan), Mitsubishi (Tokyo, Japan), RCA (Lancaster, PA), Spectra Diode Laboratories, Inc. (San Jose, CA), and Amperex (Slatersville, RI). Useful diodes particularly include those emitting radiation in the red and infrared regions. When diodes of shorter wavelength become available commercially these will also be useful in the present invention.

Modulation of the laser beam is accomplished by changing the current applied to the diode. A computer generated analog signal is used to set the current at any instant during scanning. The analog signal is generated synchronously as required by the printing process by a digital-to-analog converter (D/A), as for example, Model No. AH 8308T (Analogic Corp., Wakefield, MA).

Digital data can be supplied from medical imaging systems, weather or military satellites, video cameras, optical digitizers such as an optical drum (Optronics International, Inc., Chelmsford, MA) or an Eikonix Digitizer (Eikonix, Inc., Bedford, MA), or a computer memory in which an image is stored in digital form as a number of picture elements or pixels as is well-known in the art. This digital data can be generated by a system which records single or multiple images on hard copy. Recordation of multiple images (multiformat image recordation) is disclosed in assignee's copending patent application U.S Ser. No. 644,491 filed Aug. 24, 1984. Such a system has the capability of taking information in the form of digitized pixels with respect to an original image or images and projecting the image or images in a format that has the same or more pixels in the matrix of the projected image. The images are retrieved from data bank storage and approximately continuously magnified to fit into a selected format for hard copy recordation or projection. Images stored in one format may be translated to a different format and recorded or projected with other images on a single hard copy imageable material.

More specifically, the multiformat image recording system relates to a process for recording or projecting a digital image in a second format from digital information of an image or images in a first format where the image in the second format is composed of the same number or more pixels in a matrix than the image or images in the first format. The multiformat process comprises: (a) providing information defining an image or images as digital data of a matrix of pixels in a first format, (b) determining a magnification factor of one or greater for projection or recordation of an image or images in the second format, (c) generating pixels of the second image from the pixels of the first image or images by a means of a two-dimensional magnification process such as bilinear interpolation or linear replication, (d) transmitting the matrix of the image in the second format to an imaging means capable of projecting or recording an image in the second format, and (e) recording a final image onto a material capable of producing a hard copy.

Storage of the digital data can be accomplished using random access memory, magnetic discs, optical discs, and the like.

Several problems exist with laser diodes which must be overcome to obtain 64 gray levels as defined above. These include mode hopping, internal heating, and changes due to aging. In order to correct for these defects a beam splitter is used to split off a fraction of the output beam to a photodiode which continuously monitors the light output of the laser diode and feeds back a control system which adjusts the laser diode to stabilize the operation of the laser diode, allowing virtually instantaneous changes in the output intensity in response to the input signal, while maintaining the output constant regardless of changes in the light intensity versus current characteristics of the laser diode. A preferred technique to accomplish this type of continuous feedback control is disclosed in assignee's copending patent application U.S. Ser. No. 644,873 filed the same date as this application. Such a continuous feedback circuit can correct for long and short term changes in laser diode operating characteristics. It can provide for analog modulation of a laser diode at rates up to several million samples per second with precise control over the power output that is provided in part by a feedback arrangement wherein corrections are made in less than 50 nanoseconds. Techniques to accomplish this type of continuous feedback control are disclosed by M. Lutz., B. Reiner, and H. P. Vollmer in "Modulated Light Source for Recording with GaAlAs-Lasers", presented at *First International Congress on Advances in Non-Impact Printing Technology*, Venice, Italy (July 22–26, 1983), and D. R. Patterson and R. B. Childs in "Semiconductor Lasers Reach for Maturity: Applications in Fiber Optic Communications", *Photonics Spectra*, pages 83–87, April 1982. Preferably, the circuitry and apparatus for stabilizing the output of a laser diode and allowing the laser diode to be modulated by a wideband analog signal comprises:

means operatively arranged for receiving the signal for modulating the output of a laser diode, the means including a high gain amplifier having two inputs, one input operatively connected for receiving the signal for modulating the laser diode, the other input for receiving a feedback signal;

a compensating network connecting the output of the high gain amplifier to the laser diode;

a feedback circuit connected to provide a feedback voltage signal to the other input of the laser diode including a pin diode;

means optically coupling the pin diode to the laser diode for providing a portion of the light output from the laser diode to the pin diode.

Figure 3:
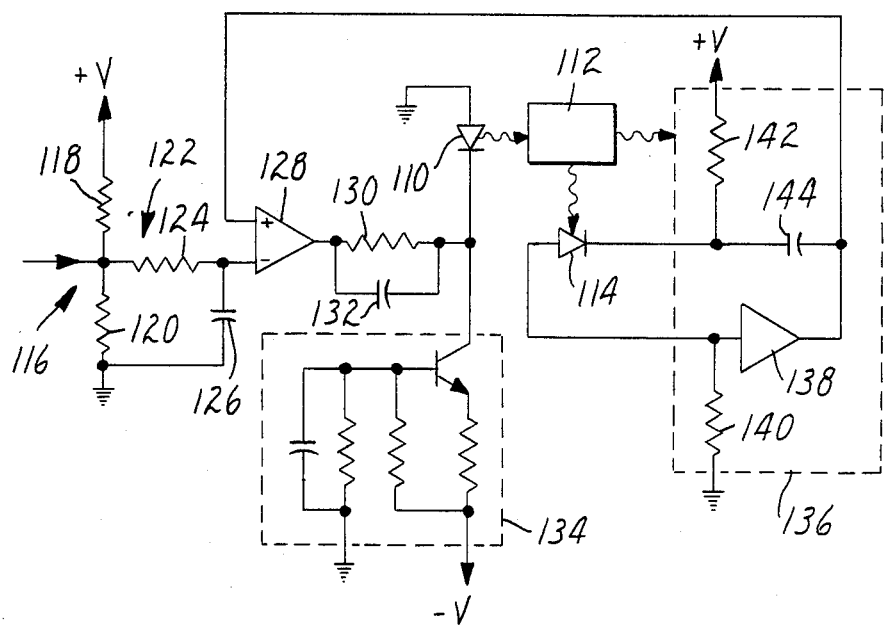
FIG. 3 is a schematic of a continuous feedback circuit wherein the optics apparatus portion is shown as a single block.

FIG. 3 shows one embodiment of such a continuous feed back circuit. Voltage input bias network 116 is provided by two series connected resistors 118 and 120 with resistor 118 connected to a positive d.c. voltage and resistor 120 connected to ground. The connection common to the resistors 118 and 120 receives an analog input signal for control of the laser diode 110. The bias network 116 provides a small d.c. offset to the circuit so the laser diode output power will not be turned off, but will drop to its threshold level when the analog input signal goes to zero. A low-pass filter 122 is provided by a resistor 124 and capacitor 126 in conjunction with the impedance looking back at the input to the circuit of FIG. 3. One end of the resistor 124 is connected to the connection common to resistors 118 and 120 with the other end of resistor 124 connected to one side of capacitor 126, which has its other side connected to ground. The low-pass filter serves to improve the closed-loop response of the circuitry in FIG. 3 in that it reduces residual peaking to expand the high end of the frequency band over which a flat gain is provided. A high-gain differential amplifier 128 is provided which has its inverting input connected to the connection common to capacitor 126 and resistor 124 with its non-inverting input connected to receive a feedback signal for stabilizing the output of the laser diode 110. The output of the differential amplifier 128 is connected to a capacitor 132 that is connected in parallel with a resistor 130 which provides a compensating network for increasing the speed and stability of the circuitry. A current source, indicated at 134, is connected to the cathode of the laser diode 110 and is also connected to the output end of the parallel connected resistor 130 and capacitor 132. The current source 134 includes a NPN transistor that is biased to provide the laser diode 110 with a current, when the output of amplifier 128 is zero, that it equal to the level required for half of the maximum output power of the laser diode. This means the current output that otherwise would be required by the amplifier 128 is reduced to provide a larger selection of high gain amplifiers that are usable in the circuit of FIG. 3. The current source 134 need not be used if an amplifier 128 is selected that has the needed output current rating.

Current produced by the pin diode 114 in response to the light output recieved from the laser diode 110 via the optics portion 112 (see beam splitter 15 in FIG. 1 and beam splitter 48 in FIG. 2) is transformed to a feedback voltage by the circuit portion 136. The circuit portion 136 includes a high speed unity gain amplifier 138, which has an input connected to the anode of the pin diode 114. A current path through the pin diode 114 is provided by resistors 140 and 142. Resistor 140 is connected between grbund and the anode of the pin diode and resistors 140 and 142. Resistor 140 is connected between ground and the anode of the pin diode and resistor 142 is connected between a positive d.c. voltage and the cathode of the pin diode. A capacitor 144 is connected between the pin diode 114 end of the resistor 142 and the output of amplifier 138 which connects to the feedback input of the differential amplifier 128. The resistor 142 and capacitor 144 serve to substantially reduce the voltage variations across the pin diode 114. The RC time constant provided by resistor 142 and capacitor 144 should be made much greater than any other time constants in the circuit portion 136. With this condition and for a gain of one for the amplifier 138, the response speed of the circuit portion 36 is optimized.

Referring to the compensating network provided by the resistor 130 and capacitor 132 parallel combination, this combination is provided by using a value for resistor 130 that is much greater than the sum of the output impedance of the amplifier 128 and the dynamic impedance of the laser diode 110. The open-loop gain of the circuitry of FIG. 3 is then inversely proportional to the magnitude of resistor 130. The resistor 130 also serves as a current limiter for the laser diode 110. The value for capacitor 132 is selected so as to provide a zero in the open-loop gain which cancels out a pole due to the response of the pin diode 114.

A series of lenses, mirrors, prisms or the like can be used to collimate and shape (straighten or make rays parallel), focus (bring together light into a spot), and/or correct the path (bend the beam to the desired path) of the laser beam in order to insure maximum resolution, uniformity of image and lack of visible artifacts such as unwanted fluctuations in image density. Such a lens system insures the spot size is uniform in dimension and intensity and is correctly located in the desired location in the recording medium. Ideally, the spot is centered within a pixel. Of particular importance is that each line be accurately located within 2.0 percent or better in order to prevent banding artifacts which can occur when lines deviate from their intended position. The spot shape is not critical but is generally Gaussian or truncated Gaussian and is chosen so that adjacent spots generally overlap at about half-intensity points. Typically 85 micrometer diameter spots are used, although 1000 to 5 micrometer diameter spots can be useful.

Scanning is a means for sweeping the beam across the recording medium in a series of horizontal parallel lines. Each line can have any number of pixels. Typically 10 pixels per mm is used, although 1 to 200 pixels per mm can be useful. Scanning is accomplished in the present invention, for example, by a polygon mirror having 1 or more reflecting facets, a scanning galvanometer, acousto-optic deflector, or a holographic deflector, all of which devices are well-known in the art. Scan width can be, for example in the range of 5 mm to 5 meters, preferably 35 mm to 75 cm.

Positioning of the scan lines of the recording medium can be accomplished, for example, by transporting the medium perpendicular to the scan line direction so that adjacent lines overlap at half-intensity points. Typically, transporting speeds in the range of 0.1 to 10 cm/sec are used, but speeds in the range of 0.01 to 50 cm/sec can be useful. Positioning of the scan lines can also be accomplished by optical deflection of the scan line, for example by use of a galvanometer mirror, or a combination of the aforementioned methods.

Accuracy of scanning line placement is critical for providing the high quality photographic images of the present invention. The requirements in the laser scanning direction and the direction perpendicular to the laser scanning direction are significantly different and will be discussed separately.

In the scanning direction the accurate placement of pixels can be determined by an f-theta lens design, the variation in velocity of the light deflecting or scanning device, and controlling the timing of supplying digital information to the laser diode. The design of these elements must be taken into consideration to produce high quality images. For example, if a motor-driven polygon is used as the deflecting device, slight variability or hunting in the velocity of the motor will cause the pixels to not line up from one line to the next. This will be especially noticeable at the end of each scan line. The last pixel of each scan line will not form a straight line down the page. For most applications variations in pixel placement of no greater than 20 percent in the scan line direction is required.

Preferably an f-theta lens is incorporated in the optical system of the present invention. In the art, in common imaging lenses, the location of the imaging spot r on an imaging plane at a projection angle $\theta$ is $$r = f \cdot \tan\theta$$

where f=focal length of imaging lens. In such a system, the projection angle of the reflected laser beam on the imaging lens linearly changes with elapse of time. Accordingly, the moving speed of the imaged spot on the imaging plane changes non-linearly, i.e. is not at constant speed. With an increase of projection angle, the moving speed increases. This causes the pixels to gradually become more spaced apart at the ends of the scan line compared to spacing at the center. In order to avoid this result, the imaging lens in the present invention is tailored so as to have the property $$r = f \cdot \theta.$$

A lens with this property is called an f-theta lens and such a lens causes the velocity of the spot to be constant across the entire scan line and also causes the pixels to be equally spaced.

As previously mentioned placement of each of the scan lines relative to each other is extremely critical for obtaining high quality images and the optical design techniques to accomplish this accurate placement are not as widely known. Random or periodic variations in line placement will cause visible banding which can be annoying to the observer and in extreme cases can reduce the number of gray levels which the system is capable of rendering. In the feed direction the scan lines will get closer and farther apart when viewed on a microscopic basis. However, when viewed without magnification slowly varying bands of density (banding) can be perceived by the observer which run parallel to the scan direction.

Banding may be minimized by careful control of the placement of each of the scan lines. A series of test images was created with periodic density fluctuations of different amplitudes at 1 lp/mm which is approximately the frequency of maximum sensitivity of the eye at normal viewing distance. Experienced observers who rated these films at normal viewing distances (30 to 60 cm) noted that only those with peak-to-peak density fluctuations of no more than 0.005 were acceptable. Simple modeling calculations showed that this corresponded to a maximum peak-to-peak acceptable error in line placement of approximately 1 percent. If the banding was at other frequencies, or random in nature, line placement errors of up to 2 percent were useful depending on the noise associated with the recording media.

Accurate positioning of scan lines can be achieved by a combination of precise optical configurations and careful control of the mechanical transportation system. Precise optical configurations may include, for example, various combinations of cylindrical and toroidal lenses as is disclosed, for example, in U.S. Pat. Nos. 3,750,189 and 4,040,096. Other useful devices include piezoelectric driven mirror systems and parabolic mirror systems.

Various methods are known to control transport of recording media with high precision, for example, using a screw-driven flat table or pinch roller drum system which have been designed for consistency of velocity. Just as accuracy of scan line placement is affected by the optical system, it can also be affected by the media transport or feeding system. The smoothness of transportation over short distances is critical to achieving the required line placement accuracy. Media may be in the form of pre-cut sheets or rolls and this may influence the choice of transport system. In the alternative as mentioned above, the recording medium may be held motionless and the scan lines adjacently displaced by use of a second scanning mirror.

Choice of recording media is limited to those capable of providing the high photographic quality of this invention. Representative examples of media include silver halide films and paper, 'dry silver' films and paper, certain photoconductor films and papers or other photoconductor media. It is important that the recording media be sensitized to match the wavelength emission and range of intensities produced by the laser diode. Also, the recording media must be capable of producing a wide range of optical densities, for example in the range up to 6.0, preferably in the range 0.1 to 3.5, under different conditions of light-intensity. All media must be capable of producing at least 64 levels of gray on transparent bases or at least 32 levels of gray on opaque media. Desirably the media is capable of providing low noise and resolution at least as good as the pixel resolution. Methods of making silver halide films and papers sensitized to IR and matched to the diode emissions which are useful in the present invention are described in assignee's copending patent application, U.S. Ser. No. 509,347, filed June 30, 1983, and U.S. Ser. No. 645,344, filed Aug. 24, 1984. 'Dry silver' media useful in the present invention are disclosed in Temporary Data Sheet 7375 (3 M, Apr. 4, 1984). An electrophotoconductor film that can be useful in the present invention is EP-infrared ™ (Kodak, Rochester, NY). The size of the recording media can be in the range of 5 mm to 5 meters.

Objects and advantages of this invention are further illustrated by the following examples, but the particular materials recited in these examples, as well as other conditions and details, should not be construed to unduly limit this invention.

EXAMPLE 1

As shown in the Drawing, FIG. 1 is a perspective view of one embodiment of a laser imaging system 10 within the present invention. Laser diode 12 (Model HLP 1000 Series 15 milliwatts emitting at 820 nm, Hitachi, Japan) was mounted on a thermoelectrically cooled block 14 which controlled the temperature of laser diode 12. Laser diode 12 was modulated by changing the current applied according to signals received from information source 2 which was a PDP 11/34 computer (Digital Equipment Corp., Maynard, MA) provided with a custom interface which supplied the data at the required average rate of 0.21 megabytes/sec and at the required peak data rate of 3.6 megabytes/sec. This data was fed to an Analog Devices (Boston, MA) A/D converter Model MDD-0820A (not shown) which provided the necessary signals to the laser diode driver circuit 4. Laser beam 16 passed through collimating lens 18, YP 4560 NC Olympus Collector Lens (Olympus Optical Co., Tokyo, Japan), focal length 4.505 mm, which collimated the beam. Beam splitter 15 was a chrome-type neutral density filter (density 0.4, Melles Griot, Irvine, CA) and generated reference beam 8 which impinged on photodetector 6. Photodetector 6 provided a signal to laser diode driver circuit 4 (see FIG. 3) which enabled reproducible intensity levels of light to be generated from laser diode 12. The remaining portion of beam 16 continued through cylindrical lenses 20 (Cat. No. LCP-001 and LCP-009, Melles Griot) focal lengths of 40 and 80 mm, which caused the beam to become round in shape. Cylindrical lens 22, focal length 300 mm (Cat. No. LCP-019, Melles Griot) in conjunction with cylindrical lens 24, focal length 150 mm (Tropel,, Inc., Fairport, NY), corrected the positioning of the beam so as to achieve the desired accuracy when it impinged on recording medium 26. When emerging from lens 22, beam 16 struck facet 28 of spinning polygon 30, (Cat. No. PO-08-300-087, Lincoln Laser Co., Phoenix, AZ). Facet 28 was a reflective surface. All other facets of polygon 30 were non reflective. Beam 16 was focused by f-theta lens 32 (Tropel, Inc.), focal length 330 mm onto recording medium 26 and in conjunction with polygon 30 insured that beam 16 moved at a constant velocity of 300 meters per sec. across recording medium 26. Front-surfaced planar mirror 34 (Edmund Scientific, Barring, NJ) reflected beam 16 perpendicular to the plane of recording medium 26. F-theta lens 32 focused beam 16 to spot 36 which had a waist of about 85 micrometers at any position on recording medium 26. Recording medium 26 rested on a lead screw-driven linear translation table (Aerotech Corp., Pittsburgh, PA) (not shown) which was moved in the direction shown at a rate of 6.78 mm/sec. As the beam 16 scanned, it was intercepted by folding mirror 38 (Edmund Scientific Corp.) and was deflected to start-of-scan SOS photodetector 39 (Cat. No. 7016 Infra Red Industries, Waltham, MA) which generated a timing signal which caused the information source 2 to provide the pixels at the appropriate instant. Beam 16 continued to scan and formed a scan line on recording medium 26. Recording medium 26 comprised 0.18 mm thick polyester film coated with a silver chlorobromide emulsion sensitized to 820 nm. A continuous tone photographic quality image 22 cm × 28 cm (8.5 in. × 11 in. was printed by the system in 41 sec. The image had 3300 lines, each line had 2560 pixels. Measurements of this image indicated there were 128 gray levels.

EXAMPLE 2

Figure 2:
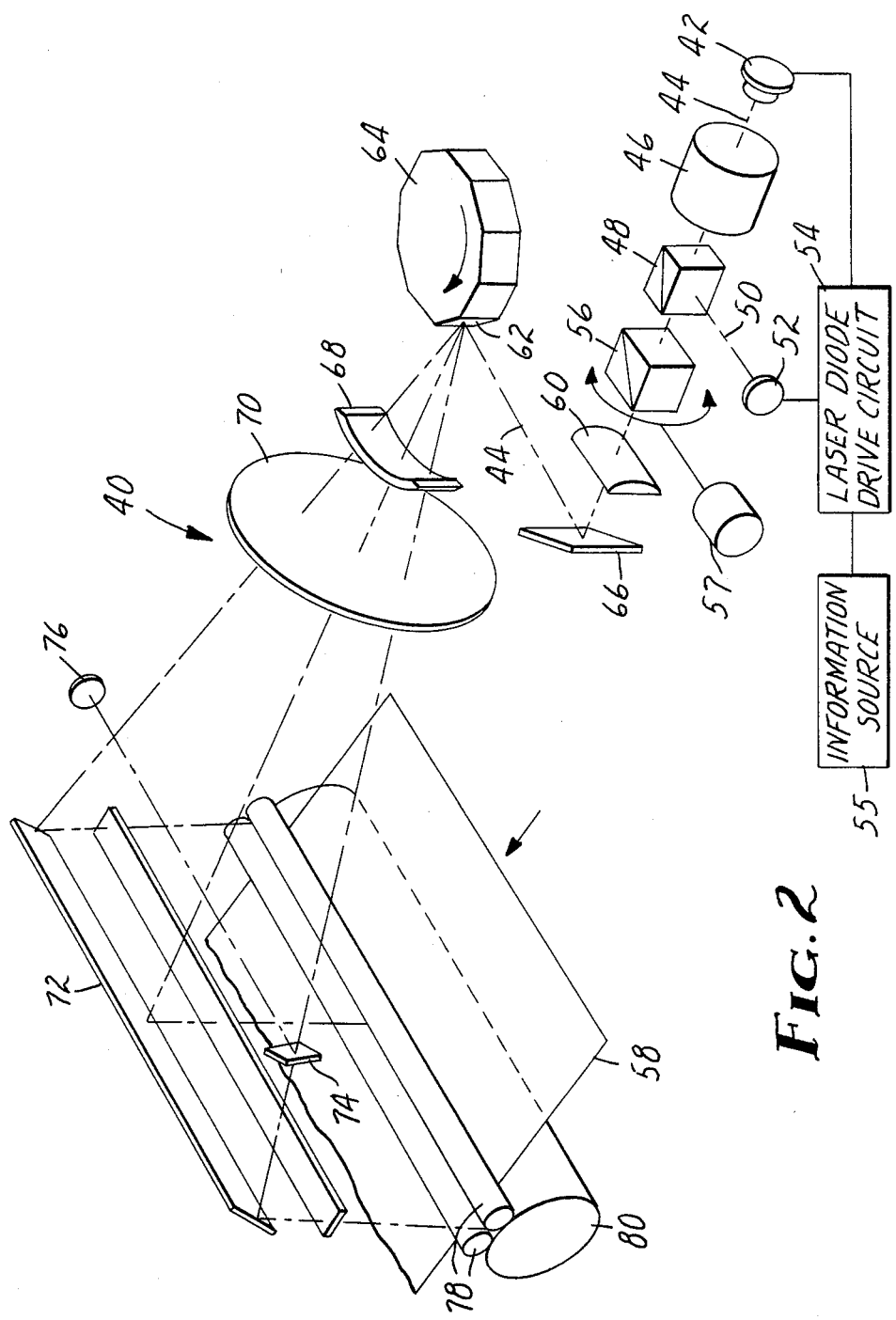
FIG. 2 shows a schematic perspective view of another embodiment of a flying spot laser diode scanning system.

FIG. 2 shows a schematic perspective view of another embodiment 40 of the present invention. Laser diode 42 emitted laser beam 44 as described in EXAMPLE 1. Information source 55, a microprocessor controlled digital data source, provided an analog computer-generated signal at the required average data rate of 2.3 megabytes/sec and a peak data rate of 3.4 megabytes/sec to laser diode drive circuit 54 which in turn controlled laser diode 42. Collimator lens assembly 46 produced a collimated beam of circular cross-section. Light emerging from collimator assembly 46 struck fixed beam splitter 48 which produced a reference beam 50 which was monitored by photodetector 52. Photodetector 52 provided a reference signal to laser diode driver continuous feedback circuit 54 (see FIG. 3) which enabled reproducible intensity levels to be created from laser diode 42. The remainder of beam 44 passed through fixed beam splitter 48 and was thereby polarized and the beam then impinged on rotated beam splitter 56 which was rotated by stepping motor 57. Since beam 44 was polarized, the position of rotated beam splitter 56 with respect to fixed beam splitter 48 determined the maximum intensity of beam 44 which reached recording medium 58. This provided adjustments for recording media of varying sensitivities. Cylindrical lens 60, having a 129 mm focal length, focused beam 44 on facet 62 of rotating polygon mirror 64, obtained from Copal Electronics, Inc. (Tokyo, Japan). Polygon mirror 64 had 10 reflecting facets and rotated at 60 Hz. Plane mirror 66 folded beam 44 and permitted a more compact optical system. Toroidal lens 68, focal length 66.9 mm, functioned in conjunction with cylindrical lens 60 to provide accurate placement of scan lines onto recording medium 58. This correction technique was similar to that described in U.S. Pat. No. 4,040,096. F-theta lens 70, focal length 380 mm, and reflected mirror 72 had a function similar to F-theta lens 32 and mirror 34 respectively of EXAMPLE 1. Start-of-scan (SOS) mirror 74 reflected beam 44 just before it impinged on mirror 72 in order to provide a beam to SOS detector 76 which triggered information source 55 to provide a line of pixels at the appropriate place on the recording medium. Recording medium 58 was transported in the direction indicated by a feed mechanism consisting of pinch rollers 78 and driven drum 80. Recording medium 58 was identical to that of EXAMPLE 1. An image having the same high quality as in EXAM- PLE 1 was provided. The recording medium was 35 cm×43 cm, the imaged area was 33 cm×41 cm, and the number of pixels along each line was 3945 and the number of lines was 4845. This area was printed in 8.5 sec.

EXAMPLE 3

Using the laser imaging system of EXAMPLE 1 dry silver paper sensitized to 820 nm was exposed and a useful image of at least 32 gray levels was produced.

EXAMPLE 4

The optical system of EXAMPLE 2 was combined with the transport system of EXAMPLE 1 to make exposures on the recording media of EXAMPLES 1 and 2. High quality continuous tone photographic images, similar to those of EXAMPLE 1, were obtained.

EXAMPLE 5

The system and procedure of EXAMPLE 1 is used except that a rotating polygon with more than one reflecting facet replaces the polygon with only one reflective surface. This results in a higher speed for generation of the image.

EXAMPLE 6

The system of EXAMPLE 2 was used except that only one facet of the rotating polygon (with 10 facets) was reflective. High quality continuous tone photographic images, similar to those of EXAMPLE 1, were obtained.

EXAMPLE 7

The optical system of EXAMPLE 2 was used, combined with the transport system of either EXAMPLES 1 or 2, except that only two (diametrically opposite) facets of the rotating polygon were reflective. High quality continuous tone photographic images, similar to those of EXAMPLE 1, were obtained.

Various modifications and alterations of this invention will become apparent to those skilled in the art without departing from the scope and spirit of this invention, and it should be understood that this invention is not to be unduly limited to the illustrative embodiments set forth herein.

We claim:

1. An image recording system comprising:
   a. means including a solid state laser diode for generating an analog signal-controlled, intensity-modulated beam of light,
   b. a feedback circuit means for responding to the instantaneous intensity of said light beam for continuously providing a feedback control signal coupled to said generating means for adjusting said laser diode to modulate the laser beam by changing the current applied to the laser diode and to stabilize its light output, allowing virtually instantaneous changes in output intensity in response to an input signal while maintaining the output constant regardless of changes in the characteristics of said laser diode,
   c. means for at least one of collimating, focusing, and controlling the path of said beam of light,
   d. means for scanning said light beam across the width of an image plane at which a photosensitive recording medium having a sensitivity and exposure range matched to the intensity-modulated light beam may be positioned, said means providing scan lines on said recording medium,
   e. means for positioning said scan lines consecutively and accurately along the length of said image plane, by at least one of transporting the medium perpendicular to the scan line direction and by optical deflection of the scan line, whereby the combination of the recited elements enables the formation at the image plane of a continuous tone image at a rate of at least 80 lines/sec., said elements being capable of creating at least 64 gray levels when imaged onto a transparent medium or at least 32 gray levels when imaged onto an opaque medium.

2. The recording system according to claim 1 wherein said laser diode has power capability of at least 3 milliwatts.

3. The recording system according to claim 1 wherein said feedback circuit comprises:
   means operatively arranged for receiving the signal for modulating the output of said laser diode, said means including a high gain amplifier having two inputs, one input operatively connected for receiving the signal for modulating said laser diode, the other input for receiving the feedback signal;
   a compensating network connecting the output of said high gain amplifier to said laser diode;
   the feedback circuit connected to provide a feedback voltage control signal to said other input of said amplifier including a pin diode; and
   means optically coupling said pin diode to said laser diode for providing a portion of the light output from said laser diode to said pin diode.

4. The recording system according to claim 1 wherein said means for scanning said laser beam across said recording medium comprises an f-theta lens, a cylindrical lens, and a toroidal lens.

5. The recording system according to claim 1 wherein said means for scanning is a polygon mirror, a scanning galvanometer, an acousto-optic deflector, or a holographic deflector.

6. The recording system according to claim 1 wherein said photosensitive recording medium is a silver halide film or paper, a 'dry silver' film or paper, a photoconductor film or paper, or other photoconductor medium.

7. The recording system according to claim 1 wherein said continuous tone image has an optical density up to 6.0.

8. The recording system according to claim 1 wherein the scan line placement accuracy has a standard deviation of less than 2 percent.

9. The recording system according to claim 1 wherein said image is a multiformat image.

10. The recording system according to claim 5 wherein said polygon mirror has at least one reflective facet.

* * * * *